United States Patent Office 3,356,763
Patented Dec. 5, 1967

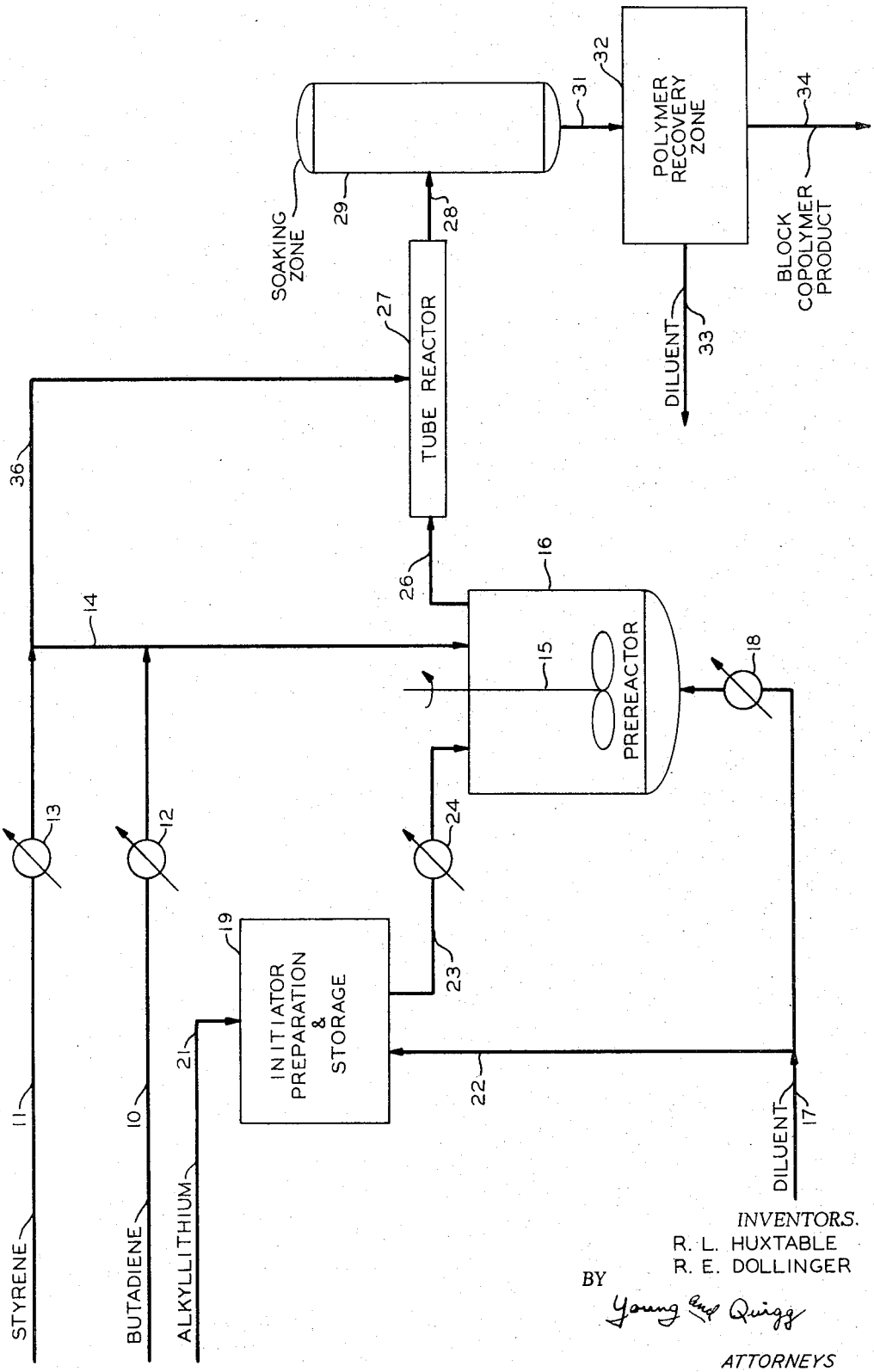

3,356,763
CONTINUOUS PROCESS FOR PRODUCING BLOCK COPOLYMERS OF DIENES AND VINYL AROMATIC HYDROCARBONS
Robert E. Dollinger, Bartlesville, Okla., and Robert L. Huxtable, Fort Smith, Ark., assignors to Phillips Petroleum Company, a corporation of Delaware
Filed Apr. 9, 1962, Ser. No. 186,178
12 Claims. (Cl. 260—880)

This invention relates to the preparation of block copolymers of certain conjugated dienes with vinyl-substituted aromatic hydrocarbons. In one aspect, it relates to a continuous process for producing these block copolymers.

Various types of polymers can be prepared from different monomeric materials, the particular type formed being generally dependent upon the procedures followed in contacting the materials in the polymerization zone. For example, copolymers such as butadiene-styrene copolymers can be prepared by the simultaneous reaction of the copolymerizable monomers. It is also possible to prepare polymers which are commonly known as graft copolymers. Graft copolymers result from the joining of a comonomer to an already formed polymer at random points along the polymer chain. Another type of polymer can be obtained by a procedure known as block polymerization. The polymers, usually referred to as block copolymers, are formed by polymerizing a monomer onto the end of a polymer, the monomer being introduced in such a manner that substantially all of the coreacting molecules enter the polymer chain at this point. The particular method used in preparing the polymer has a great influence on the properties of the product obtained. Thus, copolymers, graft copolymers, and block copolymers differ greatly in their properties even though the weight percent of each of the monomeric materials contained in the polymer may be the same in each case.

In copending application U.S. Ser. No. 721,293, filed on Mar. 13, 1958 by R. P. Zelinski, a process is disclosed for preparing block copolymers from mixtures of conjugated dienes and vinyl-substituted aromatic hydrocarbons. According to this process, a mixture of monomers, e.g., 1,3-butadiene and styrene, is polymerized in the presence of an organolithium compound, such as an alkyllithium. The polymerization is conducted in the presence of a hydrocarbon diluent, and polar compounds, such as ethers, are excluded from the process since their presence results in the formation of a random copolymer rather than a block copolymer. Block copolymers prepared according to the process are composed of two blocks, one of the blocks being a copolymer of a conjugated diene and a vinyl-substituted aromatic hydrocarbon and the other block being a homopolymer of a vinyl-substituted aromatic hydrocarbon. The process described in the Zelinski application applicable to a batch-type operation in which a mixture of the conjugated diene and a vinyl-substituted aromatic hydrocarbon is charged to a reactor containing the initiator and the diluent. It has been found that if the monomeric materials are charged to the reactor in a continuous manner, a random copolymer rather than a block copolymer is obtained from the reactor. From a commercial standpoint, it would be very desirable to provide a continuous process for preparing a block copolymer as described in the Zelinski application.

It is, therefore, an object of this invention to provide a continuous process for preparing a block copolymer by polymerizing a mixture of a conjugated diene and a vinyl-substituted aromatic hydrocarbon in the presence of an organolithium initiator.

Another object of the invention is to provide a reactor system which is suitable for preparing a block copolymer of a conjugated diene and a vinyl-substituted aromatic hydrocarbon.

Other and further objects and advantages of the invention will become apparent to those skilled in the art upon consideration of the accompanying disclosure and the drawing which is a flow diagram illustrating a preferred embodiment of the invention.

The present invention is concerned with a continuous process in which certain selected conjugated dienes and vinyl-substituted aromatic hydrocarbons are polymerized with an organolithium initiator in the presence of a hydrocarbon diluent so as to obtain a block copolymer product. Broadly speaking, the process of this invention comprises the steps of continuously charging the conjugated diene, the vinyl-substituted aromatic hydrocarbon, the organolithium initiator and the diluent to a prereaction zone wherein the polymerization is initiated, and thereafter passing the effluent from the prereaction zone into an elongated, tubular reaction zone, and recovering from the latter zone a reaction mixture containing a block copolymer of the conjugated diene and vinyl-substituted aromatic compound. In a modification of the process, additional amount of the vinyl-substituted aromatic compound is added to the elongated, tubular reaction zone in order to increase the amount of this material contained in the homopolymer block of the block copolymer.

In one embodiment, the present invention resides in a novel polymerization system which comprises a prereactor provided with a stirring means, means for introducing monomers, initiator and diluent into said prereactor, conduit means connecting the prereactor to an elongated tube reactor, and a conduit means for withdrawing reaction mixture from the tube reactor. In the practice of the present invention, it has been found to be necessary to employ the combination of a prereactor and a tube reactor in order to obtain the block copolymer product. Thus, if the reactant materials are merely introduced into a stirred reactor in a continuous manner, the product obtained is a random copolymer rather than a block copolymer. Furthermore, if a tube reactor only is utilized, the reactor becomes clogged as a result of gel formation and the product obtained is also a random copolymer rather than the block copolymer of this invention.

Conjugated dienes which are used in preparing the block copolymers of this invention are 1,3-butadiene, 2-methyl-1,3-butadiene (isoprene), and 1,3-pentadiene (piperylene). The vinyl-substituted aromatic hydrocarbons which are employed in the practice of the invention can be any vinyl-substituted aromatic hydrocarbon in which the vinyl group is attached to a nuclear carbon atom. It is to be understood that a compound having a constituent on the alpha carbon atom, such as alpha-methyl styrene, is not applicable to the practice of the present invention. Vinyl-substituted aromatic hydrocarbons which can be advantageously utilized include styrene, 1-vinylnaphthalene, 2-vinylnaphthalene, 3-methylstyrene, and alkyl, cycloalkyl, aryl, aralkyl, and arylalkyl derivatives thereof in which the total number of carbon atoms in the combined substituents is generally not greater than 12. Examples of these aromatic hydrocarbons include:

3-methylstyrene (3-vinyltoluene)
3,5-diethylstyrene
4-n-propylstyrene
2,4,6-trimethylstyrene
4-dodecylstyrene
3-methyl-5-n-hexylstyrene
4-cyclohexylstyrene
4-phenylstyrene
2-ethyl-4-benzylstyrene
4-p-tolylstyrene 3,5-diphenylstyrene
2,4,6-tri-tert-butylstyrene
2,3,4,5-tetramethylstyrene
4-(4-phenyl-n-butyl)styrene
3-(4-n-hexylphenyl)styrene
4,5-dimethyl-1-vinylnaphthalene
3-ethyl-1-vinylnaphthalene
6-isopropyl-1-vinylnaphthalene
2,4-diisopropyl-1-vinylnaphthalene
3,6-di-p-tolyl-1-vinylnaphthalene
6-cyclohexyl-1-vinylnaphthalene
4,5-diethyl-8-octyl-1-vinylnaphthalene
3,4,5,6-tetramethyl-1-vinylnaphthalene
3,6-di-n-hexyl-1-vinylnaphthalene
8-phenyl-1-vinylnaphthalene
5-(2,4,6-trimethylphenyl)-1-vinylnaphthalene
3,6-diethyl-2-vinylnaphthalene
7-dodecyl-2-vinylnaphthalene
4-n-propyl-5-n-butyl-2-vinylnaphthalene
6-benzyl-2-vinylnaphthalene
3-methyl-5,6-diethyl-8-n-propyl-2-vinylnaphthalene
4-o-talyl-2-vinylnaphthalene
5-(3-phenyl-n-propyl)-2-vinylnaphthalene In the monomer mixture which is polymerized according to the present process, the total amount of the vinyl-substituted aromatic hydrocarbon is in the range of 15 to 60 parts by weight per 100 parts by weight of total monomers. Furthermore, with regard to the product obtained, at least 45 weight percent of the vinyl-substituted aromatic hydrocarbon contained in the composition should be in the homopolymer block or blocks of the block copolymer.

The initiator employed in the present process is an organolithium compound. It is often preferred to employ a compound having the formula RLi, wherein R is a radical selected from the group consisting of alkyl, aryl, and cycloalkyl. It is to be understood that combinations of these radicals, such as arylalkyl, aralkyl, alkylcycloalkyl, and cycloalkylalkyl, can be used. The R radical in the formula preferably contains from 2 to 10, inclusive, carbon atoms. Examples of these compounds include ethyllithium, isopropyllithium, n-butyllithium, tert-octyllithium, n-decyllithium, phenyllithium, naphthayllithium, 4-butylphenyllithium, 3-tolyllithium, 4-phenylbutyllithium, cyclohexyllithium, 4-butylcyclohexyllithium, 4-cyclohexylbutyllithium, and the like. When utilizing this type of compound as the initiator, the block copolymer product is composed of two polymer blocks, i.e., a copolymer block of a conjugated diene and a vinyl-substituted aromatic hydrocarbon and a homopolymer block of a vinyl-substituted aromatic hydrocarbon. In preparing a block copolymer containing two polymer blocks, a lithium atom attaches itself to one end of the copolymer molecules, and after all the conjugated diene is polymerized, the vinyl-substituted aromatic polymerizes onto the end of the copolymer molecules having the attached lithium atom.

As disclosed in copending U.S. application Ser. No. 162,636, filed on Dec. 26, 1961, by R. P. Zelinski, now U.S. 3,287,333 (1966), a block copolymer containing three blocks can be prepared by providing an initiator system whereby a lithium atom is attached to each end of the polymer block initially formed in the polymerization. It is to be understood that such initiators can also be employed in the practice of the present invention. As disclosed in the Zelinski application, the initiator comprises the reaction product of lithium and a condensed ring aromatic compound. The condensed ring aromatic compound is selected from the group consisting of naphthalene, anthracene, and phenanthracene and alkyl derivatives thereof in which the total number of carbon atoms in the alkyl group or groups is preferably in the range of 1 to 6 carbon atoms. Examples of alkyl derivatives of naphthalene, anthracene and phenanthracene include 1-methylnaphthalene, 2-methylnaphthalene, 1-tert-butylnaphthalene, 2 - amylnaphthalene, 2,4-di-n-propylnaphthalene, 9-methylantharcene, 1,4,5-triethylanthracene, 2,7-dimethylphenanthrene, and the like. In reacting these materials, at least two gram atoms of lithium per mol of the condensed ring aromatic compound is employed. It is generally preferred to employ an excess of lithium, e.g., four gram atoms, in preparing the initiator system. After the reaction is completed, the excess lithium can be removed by filtration, decantation or other suitable methods. The materials are generally reacted at a temperature below 50° F., e.g., at a temperature in the range of −40° F. to 40° F.

The reaction of the lithium and the aromatic compound is conducted in a polar solvent, and ethers are usually employed for this purpose. It is preferred to use as a solvent an aliphatic monoether having the formula ROR, wherein each R is an alkyl group containing from 2 to 12, inclusive, carbon atoms. Examples of such ethers include diethyl ether, diisopropyl ether, di-n-butyl ether, di-sec-butyl ether, ethyl n-propyl ether, ethyl isobutyl ether, ethyl butyl ether, ethyl n-pentyl ether, and the like. Other polar solvents, such as thioethers and tertiary amines, e.g., diethyl sulfide and triethylamide, can also be utilized as the solvent. Examples of other suitable thioethers and tertiary amines include diisopropyl sulfide, ethyl isopropyl sulfide, ethyl n-propyl sulfide, isopropyidiethylamine and di-n-propylethylamine. The amount of the polar solvent employed in reacting the lithium with the condensed ring aromatic compounds is not critical and can, therefore, vary within very wide limits. However, it has been found that there is a maximum amount of the polar compound that can be tolerated in the polymerization while still obtaining the block copolymer product. Thus, as a practical matter, it is usually desirable to limit the amount of polar compound used in preparing the initiator to that which can be tolerated in the polymerization. The amount of the polar solvent which can be tolerated in the polymerization system is critical. For example, in the case of ether, not more than about 1.75 parts of ether per 100 parts of total monomers can be present in the polymerization system. Otherwise, a block copolymer in which the end blocks contain at least 45 percent of the polymerized vinyl-substituted aromatic compound is not obtained. It is usually preferred that the amount of ether present in the system be not more than about 1.2 parts per 100 parts of total monomers. If the amount of the polar compound employed in preparing the initiator system exceeds the amount as specified above, it then becomes necessary to remove a portion of it prior to using the initiator in the polymerization. This can be accomplished by distillation or by replacement of the polar solvent with a hydrocarbon, preferably of the type to be used in the polymerization. There is nothing critical as regards to time during which the materials are reacted in forming the initiator system. The reaction is usually continued until all of the condensed ring aromatic compound has reacted with the lithium metal although it is not essential that such a procedure be followed. The reaction time generally falls within the range of 1 to 20 hours although shorter and longer times can be utilized.

The process of this invention is carried out in the presence of a hydrocarbon diluent selected from the group consisting of paraffinic, cycloparaffinic and aromatic hydrocarbons. The preferred hydrocarbons are those containing from 3 to 12, inclusive, carbon atoms. Examples of suitable diluents include propane, isobutane, n-pentane, isooctane, n-dodecane, cyclopentane, cyclohexane, methylcyclohexane, benzene, toluene, xylene, naphthalene, and the like. It is to be understood that mixtures of two or more of these hydrocarbons can be used in the process.

When using the RLi compound as the initiator, the amount of the compound employed can vary over a wide range. In general, at least 0.05 parts by weight of the monolithium compound per 100 parts by weight of the total monomers to be polymerized is employed in the process. The upper limit for the amount of the organolithium compound to be used depends primarily upon the desired inherent viscosity of the block copolymer resulting from the polymerization. The inherent viscosity of the polymer produced decreases with increasing amounts of organolithium compound. A preferred initiator level is from 0.1 to 2 parts by weight of the monolithium compound per 100 parts by weight of total monomers charged to the polymerization zone.

Referring now to the drawing, there is shown a flow diagram which illustrates a preferred embodiment of the invention. While the drawing will be described with regard to particular reactant materials, it is to be understood that the invention is applicable to the use of other materials as discussed hereinbefore. A conjugated diene, such as 1,3-butadiene, enters the system through line 10 while a vinyl-substituted aromatic hydrocarbon, such as styrene, is added through line 11. Lines 10 and 11 can each be provided with indirect heat exchangers 12 and 13 whereby the materials can be heated to about the polymerization temperature. The materials flowing through lines 10 and 11 are thereafter mixed in line 14 through which they enter prereactor 16. The prereactor is provided with a suitable stirring means 15, which operates to provide good contact between the materials charged. The amount of styrene contained in the mixture of monomers entering prereactor 16 through line 14 is in the range of 15 to 60 parts by weight per 100 parts by weight of total monomers. Various materials are known to be destructive to the initiator systems used in the present process. These materials include carbon dioxide, oxygen and water. It is very desirable, therefore, that the monomers be freed of these materials as well as other materials which may tend to inactivate the initiator. Any of the known means for removing such contaminants can be used. It is also preferred that the diluent used in the process be substantially free of impurities such as water, oxygen and the like. In this connection, any air or moisture in the system is generally removed therefrom by purging with an inert gas, such as nitrogen, prior to charging of the reactant materials.

A hydrocarbon diluent, such as cyclohexane, is charged to prereactor 16 through line 17. Line 17 is also provided with an indirect heat exchanger 18 in order to provide means for heating the diluent to the polymerization temperature. An alkyllithium compound, such as n-butyllithium, is charged to the initiator preparation and storage zone 19 through line 21. A hydrocarbon diluent, similar to that used in the polymerization, is charged to zone 19 through line 22. The solution of n-butyllithium in cyclohexane is withdrawn from zone 19 and thereafter passed into prereactor 16 through line 23. Line 23 can also be provided with an indirect heat exchanger 24 for use in heating the initiator solution to the polymerization temperature.

When utilizing a monolithium compound, such as n-butyllithium, zone 19 can merely be a vessel in which the lithium compound and diluent are mixed. However, as discussed hereinbefore, it is within the purview of the invention to utilize as the initiator the reactor product of lithium and a condensed ring aromatic compound. When employing this latter initiator system, zone 19 can comprise a reaction vesesl in which the lithium and the condensed ring aromatic compound are reacted and, when required, a means for removing excess ether, such as a distillation means.

The temperature employed in prereactor 16 can vary over a rather wide range, e.g., from 120 to 350° F. It is usually preferred to operate at a temperature in the range of 180 to 250° F. The pressure maintained in prereactor 16 is sufficient to maintain the reactant materials substantially completely in the liquid phase. It has been found to be desirable to introduce the initiator and the monomers into the liquid phase at widely separated points. In another method of operating prereactor 16, a gas cap is maintained in the reactor and a mixture of the initiator, monomers, and a portion of the diluent are introduced so that it falls through the gas cap before contacting the liquid in the reactor. The remainder of the diluent is heated and flowed directly into the liquid contained in the reactor or through the gas cap to provide the initiation temperature desired. The residence time of the materials in prereactor 16 is usually in the range of 30 seconds to 5 minutes. It is preferred to employ a residence time of 30 seconds to 2 minutes. The amount of the total mixture of monomers converted to polymer in prereactor 16 is generally in the range of 10 to 75 weight percent, preferably 25 to 65 percent.

After the desired residence time, the reaction mixture formed in prereactor 16 is withdrawn through line 26 and passed into one end of tube reactor 27. The tube reactor can comprise a pipe having a length dependent upon the residence time which it is desired to use in conducting the process. It is usually preferred that the residence time in the tube reactor be in the range of 5 minutes to 40 minutes. The polymerization continues in the tube reactor until the desired conversion is obtained. Generally, the process is conducted so that the conversion of monomers to polymer is substantially completed in the tube reactor. The reaction mixture containing block copolymer, diluent and initiator, and in some instances, unreacted vinyl-substituted aromatic hydrocarbon, is withdrawn from the tube reactor 27 through line 28 and then passed into soaking zone 29. The soaking zone can be a separate vessel as shown in the drawing, or it may be merely a continuation of the tube reactor. When the soaking zone is a continuation of the tube reactor, the diameter of the pipe forming the soaking zone generally has a diameter greater than that of the tube reactor itself. In the event the reaction mixture charged to the soaking zone contains unreacted monomer, the polymerization continues in the soaking zone.

The temperature maintained in tube reactor 27 and in the soaking zone is substantially the same as that in the prereactor. The polymerization reaction is generally allowed to proceed as an adiabatic reaction although it is usually undesirable to employ a temperature greater than about 350° F. If the temperature in either the prereactor or the tube reactor should become excessively high, e.g., above 350° F., the temperature of polymerization can be conveniently lowered by controlling the temperature of the diluent introduced into the prereactor through line 17.

The polymerization mixture in soaking zone 29 is withdrawn through line 31 and then passed into polymer recovery zone 32. The polymer recovery zone comprises means suitable for recovering the block copolymer product from solution in the cyclohexane. In one method of polymer recovery, the initiator is inactivated by the addition of material, such as ethyl alcohol, isopropyl alcohol, or the like. It is usually preferred to add only an amount of initiator-deactivating material which is sufficient to deactivate the initiator without causing precipitation of the desired polymer. It has also been found to be advantageous to add an antioxidant, such as 2,2'-methylene-bis(4-methyl-6-tert-butylphenol), to the polymer solution prior to precipitation of the polymer. After addition of the initiator-deactivating agent and antioxidant, the polymer present in the solution can then be precipitated by the addition of an excess of a material, such as ethyl alcohol or isopropyl alcohol. It is to be understood, however, that the deactivation of the initiator and precipitation of the polymer, can be accomplished in a single step. The precipitated polymer can then be recovered by filtration, decantation or the like. In order to further purify the polymer, the separated polymer can be redissolved in a suitable solvent and again precipitated by addition of an alcohol. Thereafter, the polymer is again recovered by suitable separation means as indicated hereinbefore and dried. Any suitable hydrocarbon diluent, such as those mentioned hereinbefore, can be used in this purification step to redissolve the polymer. The diluent and alcohol can in all cases be separated, for example, by fractional distillation and reused in the process. In another method of polymer recovery, the polymer solution recovered from soaking zone 29 is passed to a steam stripping zone wherein the diluent is removed from the solution in a steam stripping operation. The diluent which is recovered from zone 32 through line 33 can, after suitable treatment, be recycled to the prereactor. A block copolymer product recovered from zone 32 can be further dried, as required, and then sent to storage facilities.

As mentioned hereinbefore, from 10 to 75 weight percent of the total amount of monomers is converted to polymer in prereactor 16. It has also been mentioned that the block copolymer prepared by the present process contains a copolymer block and one or two homopolymer blocks of the vinyl-substituted aromatic hydrocarbon. In the polymerization, the butadiene polymerizes much more rapidly than the styrene so that the copolymer block initially formed contains only a very small amount of styrene. The amount of styrene contained in the copolyblock will vary with the composition of the feed material, but is generally less than half of the total amount of styrene charged to the polymerization system. At conversions in the range of 10 to 75 weight percent, the reaction mixture withdrawn from prereactor 16 generally contains only copolymer of butadiene and styrene. The formation of the copolymer block generally continues in the tube reactor until all of the butadiene is polymerized. Thereafter, the remaining styrene polymerizes onto the end of the copolymer block, thereby forming the homopolymer block of styrene. Depending on the amount of butadiene contained in the original feed stream, the formation of the homopolymer block generally occurs entirely within the tube reactor and usually in a downstream half of the tube reactor. The actual portion of the system in which the polymerization of the styrene to a homopolymer occurs will, of course, depend upon the amount of conversion which has taken place in the prereactor and upon the amount of butadiene contained in the feed stream. For example, with a feed stream containing 40 parts butadiene and 60 parts styrene and at conversions approaching 45 percent in the prereactor, the copolymer block will be substantially completely formed in the prereactor, and only the homopolymer block of styrene will be formed in the tube reactor. However, in case of a mixture containing 85 parts by weight butadiene and 15 parts by weight of styrene, only a portion of the block copolymer will be formed in the prereactor, the remaining part of the copolymer block being formed in the upstream end of the tube reactor. In one embodiment of the invention, additional styrene is introduced into the tube reactor through line 36. The styrene is preferably introduced into the tube reactor after the copolymer block has been completely formed, i.e., after all of the butadiene has been polymerized. By charging additional styrene in this manner, it is possible to increase the amount of styrene contained in the homopolymer blocks. However, it is to be understood that the polymerization in the tube reactor occurs in the absence of freshly added conjugated diene.

A more comprehensive understanding of the invention can be obtained by referring to the following illustrative examples, which are not intended, however, to be unduly limitative of the invention.

*Example I*

A run was carried out according to the present invention in which a mixture of 1,3-butadiene and styrene was polymerized with n-butyllithium. The reactor system employed in this run was substantially the same as that shown in the drawing. The prereactor was a one-half gallon vessel provided with a stirring means. The initiator, monomer, and diluent feed lines were connected to the prereactor as shown in the drawing. The tube reactor consisted of 150 feet of 3/8" copper tubing and the soaking zone consisted of three sections of 2" pipe, each section being two feet long. The soaking section was connected directly into the downstream end of the copper tubing.

In this run, the one-half gallon stirred reactor was operated liquid full. A mixture of butadiene and styrene was continuously charged into the top of the stirred reactor. A 0.66 weight percent solution of butyllithium in n-hexane was also charged into the top of the prereactor at a point 180° removed from the point of introduction of the monomer mixture. The diluent n-hexane was heated and introduced into the bottom of the prereactor. The conditions of operation and the flow rates are set forth hereinbelow in Table I.

TABLE I

| | |
|---|---|
| Initiator [1], lbs./min. | 0.018 |
| Mixture of monomers [2], lbs./min. | 0.05 |
| Total diluent, lbs./min. | 0.75 |
| Temperature, °F. | 210 |

[1] Charged as a 0.66 weight percent solution of butyllithium in n-hexane.
[2] 25 parts by weight of styrene and 75 parts by weight of butadiene.

The block copolymer product obtained in this run contained 25 weight percent bound styrene, and the homopolymer block contained 11 weight percent styrene. The run was continued for a period of eight and one-half hours, and there was only a slight formation of gel in the reactor system.

In this and succeeding examples, the amount of styrene contained in the homopolymer block was determined by an oxidative degradation procedure. The oxidation method is based upon the principle that polymer molecules containing ethylenic bonds when dissolved in p-dichlorobenzene and toluene can be broken into fragments by reaction with tert-butyl hydroperoxide catalyzed with osmium tetroxide. Saturated polymer molecules or molecular segments such as polystyrene or the polystyrene units in block copolymers containing no ethylenic bonds remain unattacked. The small fragments, (low molecular weight aldehydes) and the low molecular weight polystyrene fragments from the copolymer block are soluble in ethanol whereas the unattacked high molecular weight polystyrene from the styrene homopolymer blocks is insoluble in ethanol. It is thus possible to effect a separation of a high molecular weight polystyrene which constitutes the homopolymer blocks of the block copolymer.

Approximately 0.5 gram of the polymer prepared as described was cut into small pieces, weighed within 1 milligram and charged to a 125 milliliter flask. Forty to fifty grams of p-dichlorobenzene was then charged to the flask and the flask was heated to 130° C. The flask was maintained at this temperature until the polymer present had become dissolved. The solution was then cooled from 80 to 90° C., and 8.4 ml. of a 71.3 percent by weight aqueous solution of tert-butyl hydroperoxide was added. One milliliter of 0.003 molar osmium tetraoxide in toluene was then charged to the flask contents, and the resulting solution was heated to between 110 and 115° C. for 10 minutes. The solution was then cooled to between 50 to 60° C., afterwards 20 ml. of toluene were added, and the solution was poured slowly into 250 ml. of ethanol containing a few drops of concentrated sulfuric acid. Polystyrene coagulated out of solution, and this polymer was recovered and dried. The weight percent of polystyrene recovered is the measure of the amount of styrene contained in the homopolymer block.

*Example II*

Another run was conducted in which a monomer mixture containing 75 weight percent 1,3-butadiene and 25 weight percent styrene was polymerized with n-butyllithium in the presence of n-hexane. In this run, the prereactor had a capacity of 750 ml. and was provided with a stirring means. The prereactor was connected to a tube reactor consisting of 300 feet of ⅜" copper tubing. A soaking zone consisting of three 2' section of 2" pipe was connected to the downstream end of the copper tubing. The flow rates employed in this run, which was carried out essentially the same as Example I, are set forth below in Table II.

TABLE II

| | |
|---|---|
| Initiator,[1] lbs./min. | 0.024 |
| Monomer mixture,[2] lbs./min. | 0.09 |
| Total diluent, lbs./min. | 0.60 |
| Temperature, °F. | 210 |

[1] Charged as a 0.35 weight percent solution of butyllithium in n-hexane.
[2] 25 parts by weight of styrene and 75 parts by weight of butadiene.

The run was continued for a period of 4 hours, and no fouling of the reaction system occurred during the run. The block copolymer produced contained 25.6 weight percent bound styrene and 16.4 weight percent of styrene was contained in a homopolymer block. The block copolymer product has a Mooney value (ML–4) of 74.

Example III

A control run was conducted in which the reactor system consisted merely of a tube reactor, the prereactor being omitted from the system. The tube reactor consisted of fifty feet of ⅜" inch copper tubing. One end of the tubing was connected to a T which provided means for introducing and mixing the reactant materials prior to their passage into the tubing. The flow rates employed in this run as well as other conditions are set forth below in Table III.

TABLE III

| | |
|---|---|
| Initiator,[1] lbs./min. | 0.028–0.132 |
| Monomer mixture,[2] lbs./min. | 0.05 |
| Total diluent (n-hexane), lbs./min. | 0.91 |
| Temperature, °F. | 250 |

[1] Charged as a 0.71 weight percent solution of n-butyllithium in n-hexane.
[2] 25 weight percent styrene and 75 weight percent butadiene.

In this run, the tube reactor plugged after a period of about 4.7 hours. The polymer produced in the run contained 41.7 weight percent gel and 1.2 weight percent polystyrene. It was thus seen that the block copolymer was not produced in a reactor system which merely consisted of a tube reactor.

Example IV

Another control run was carried out in which the reactor system consisted of a tube reactor. The tube reactor was formed of 50 feet of ½" stainless steel tubing containing two ⅛" orifice near the upstream end of the tubing. A mixture of monomer and solvent was introduced tangentially through ¼" tubing while the catalyst was introduced axially into the reactor through ⅛" tubing. The flow rates and other reaction conditions are shown below in Table IV.

TABLE IV

| | |
|---|---|
| Initiator [1], lbs./min. | 0.16–0.24 |
| Monomer, mixture [2], lbs./min. | 0.05 |
| Total diluent (n-hexane), lbs./min. | 0.47 |
| Initiation temperature, °F. | 210 |
| Maximum temperature, °F. | 272 |

[1] Charged as a 0.71 weight percent solution of n-butyllithium in n-hexane.
[2] 25 weight percent styrene and 75 weight percent butadiene.

In this run, the reactor plugged after a period of 1.5 hours. The plugging occurred primarily in the first five feet of the tube reactor. This run demonstrates that the combination of a prereactor and a tube reactor is necessary in order to obtain the block copolymer product.

The block copolymers produced in accordance with this invention have utility in general in applications where natural and synthetic rubbers are used. For example, they can be employed in the manufacture of automobile tires, gaskets, and other rubbery articles. The block copolymers can also be advantageously utilized as adhesives. They are particularly useful in performing extruded articles, such as coated wire, because of their high extrudability. The block copolymers are also thermoplastic and show no shrinkage when molded. These properties render the block copolymers suitable for use in preparing molded articles. Block copolymers of this invention are further characterized by their very high green tensile strengths.

The block copolymers can be compounded by any of the known methods such as have been used in the past for compounding natural and synthetic rubbers. Vulcanization accelerators, reinforcing agents, and fillers, such as have been employed in synthetic and natural rubbers, can likewise be used in compounding the block copolymers.

As will be evident to those skilled in the art, many variations and modifications of the invention can be practiced in view of the foregoing disclosure. Such variations and modifications are believed to be clearly within the spirit and scope of the present invention.

We claim:

1. A continuous process for preparing a block copolymer which comprises continuously charging to a prereaction zone the following materials: (1) a conjugated diene selected from the group consisting of 1,3-butadiene, isoprene and piperylene, (2) a vinyl-substituted aromatic hydrocarbon, (3) an organolithium polymerization initiator, and (4) a hydrocarbon diluent selected from the group consisting of paraffinic, cycloparaffinic and aromatic hydrocarbons, said prereaction zone being maintained at conditions to maintain said materials substantially completely in the liquid phase; withdrawing from said prereaction zone an actively polymerizing effluent containing polymer which is 10 to 75 weight percent of the originally charged monomers, unreacted monomer, and diluent; passing said effluent into one end of an elongated, tubular reaction zone; and continuously recovering from the downstream end of said latter zone a reaction mixture containing a block copolymer of said conjugated diene and said vinyl-substituted aromatic hydrocarbon.

2. A process according to claim 1 in which said conjugated diene is 1,3-butadiene and said vinyl-substituted aromatic hydrocarbon is styrene.

3. A process according to claim 1 in which said conjugated diene is isoprene and said vinyl-substituted aromatic hydrocarbon is styrene.

4. A process according to claim 1 in which said initiator is n-butyllithium.

5. A process according to claim 1 in which said initiator is isopropyllithium.

6. A process according to claim 1 in which said initiator is isobutyllithium.

7. A process according to claim 1 in which said initiator is phenyllithium.

8. A process according to claim 1 in which said initiator is the reaction product obtained by reacting lithium with methylnaphthalene.

9. A continuous process for preparing a block copolymer which comprises continuously charging to a prereaction zone the following materials: (1) a conjugated diene selected from the group consisting of 1,3-butadiene, isoprene and piperylene, (2) a vinyl-substituted aromatic hydrocarbon, (3) an organolithium polymerization initiator, and (4) a hydrocarbon diluent selected from the group consisting of paraffinic, cycloparaffinic and aromatic hydrocarbons, said prereaction zone being maintained at a temperature in the range of 120 to 350° F. and at a pressure sufficient to maintain said materials substantially completely in liquid phase and a residence time in said prereaction zone being in the range of 30 seconds to 5 minutes; withdrawing from said prereaction zone an actively polymerizing effluent containing polymer which is 10 to 75 weight percent of the originally charged monomers, unreacted monomer, and diluent; passing said effluent into one end of an elongated tubular reaction zone, the residence time in said zone being in the range of 5 to 40 minutes; and continuously recovering from the downstream end of said latter zone a reaction mixture containing a block copolymer of said conjugated diene and said vinyl-substituted aromatic hydrocarbon.

10. The process according to claim 9 in which the amount of said vinyl-substituted aromatic hydrocarbon charged to said prereaction zone is in the range of 15 to 60 parts by weight per 100 parts by weight of said conjugated diene and said vinyl-substituted aromatic hydrocarbon.

11. The process according to claim 9 in which an additional amount of vinyl-substituted aromatic hydrocarbon is added to an intermediate point of said elongated, tubular reaction zone.

12. A continuous process for preparing a block copolymer which comprises continuously charging to a prereaction zone (1) a feed stream comprising (a) a conjugated diene selected from the group consisting of 1,3-butadiene, isoprene and piperylene and (b) a vinyl-substituted aromatic hydrocarbon, (2) an initiator selected from the group consisting of (c) a compound having the formula RLi, wherein R is a radical selected from the group consisting of alkyl, aryl and cycloalkyl, and (d) the reaction product obtained by reacting lithium with a condensed ring aromatic compound, and (3) a hydrocarbon diluent selected from the group consisting of paraffinic, cycloparaffinic and aromatic hydrocarbons; polymerizing conjugated diene and vinyl-substituted aromatic hydrocarbon in said prereaction zone at conditions to maintain the reactant materials substantially completely in the liquid phase, thereby forming copolymer of said conjugated diene and said vinyl-substituted aromatic hydrocarbon; withdrawing from said prerecation zone an actively polymerizing effluent containing copolymer of said conjugated diene and said vinyl-substituted aromatic hydrocarbon which is 10 to 75 weight percent of the originally charged monomers, unreacted vinyl-substituted aromatic hydrocarbon, and diluent; passing said effluent to one end of an elongated tubular reaction zone; polymerizing vinyl-substituted aromatic hydrocarbon in said tubular reaction zone, thereby forming a homopolymer of said vinyl-substituted aromatic hydrocarbon, said polymerizing taking place in the absence of freshly added conjugated diene, and continuously recovering from the downstream end of said tubular reaction zone a reaction mixture containing a block copolymer of said conjugated diene and said vinyl-substituted aromatic hydrocarbon.

References Cited
UNITED STATES PATENTS

| | | | |
|---|---|---|---|
| 2,838,380 | 6/1958 | Kean | 23—285 |
| 2,863,849 | 12/1958 | Fordham | 260—880 |
| 2,872,438 | 2/1959 | Carroll et al. | 260—95 |
| 2,894,824 | 7/1959 | Lanning | 23—285 |
| 2,975,160 | 3/1961 | Zelinski | 260—83.7 |
| 3,030,346 | 4/1962 | Cooper | 260—880 |
| 3,057,840 | 10/1962 | Pollock | 260—95 |
| 3,078,254 | 2/1963 | Zelinski et al. | 260—880 |
| 3,198,774 | 8/1965 | Huxtable et al. | 260—83.7 |
| 3,297,793 | 1/1967 | Dollinger | 260—879 |

SAMUEL H. BLECH, *Primary Examiner.*

LEON J. BERCOVITZ, *Examiner.*

GEORGE F. LESMES, N. W. SHUST,
*Assistant Examiners.*